(12) United States Patent
Harada (10) Patent No.: US 8,521,415 B2
(45) Date of Patent: Aug. 27, 2013

(54) TRAVELING VEHICLE AND METHOD OF CONTROLLING THE SAME

(75) Inventor: Keizo Harada, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 211 days.

(21) Appl. No.: 13/210,417

(22) Filed: Aug. 16, 2011

(65) Prior Publication Data

US 2012/0053827 A1 Mar. 1, 2012

(30) Foreign Application Priority Data

Aug. 26, 2010 (JP) ................................. 2010-190104

(51) Int. Cl.
  *G08G 1/16* (2006.01)
(52) U.S. Cl.
  USPC .............................. 701/301; 701/23; 701/300
(58) Field of Classification Search
  USPC ..... 701/23–28, 300–302, 409–411; 340/435, 340/436
  See application file for complete search history.

(56) References Cited

U.S. PATENT DOCUMENTS

| | | | |
|---|---|---|---|
| 8,060,306 B2 * | 11/2011 | Puhalla et al. | 701/301 |
| 8,126,642 B2 * | 2/2012 | Trepagnier et al. | 701/423 |
| 8,229,618 B2 * | 7/2012 | Tolstedt et al. | 701/23 |

FOREIGN PATENT DOCUMENTS

| | | |
|---|---|---|
| JP | 01-106205 A | 4/1989 |
| JP | 10-161745 A | 6/1998 |
| JP | 2001-282356 A | 10/2001 |
| JP | 2005-025501 A | 1/2005 |
| JP | 2006-259877 A | 9/2006 |
| JP | 2011-034518 A | 2/2011 |

* cited by examiner

*Primary Examiner* — Richard M. Camby
(74) *Attorney, Agent, or Firm* — Keating & Bennett, LLP (57) ABSTRACT

A traveling vehicle includes an obstacle sensor; a controller which causes the traveling vehicle to perform a first avoidance operation so as to avoid an obstacle according to a result of the detection of the obstacle; a memory unit configured to store position information indicating a position of the obstacle in a traveling path and avoidance amount information indicating an amount of avoidance in a lateral direction performed by the traveling vehicle in the first avoidance operation; wherein, when the obstacle sensor detects an obstacle at the position indicated by the position information at a point when the obstacle is within a first distance from the traveling vehicle, the controller causes the traveling vehicle to start a second avoidance operation, before the distance from the traveling vehicle to the obstacle reaches a second distance, so as to avoid the obstacle based on the avoidance amount information stored in the memory unit.

6 Claims, 10 Drawing Sheets

[When Wr - Wo > K (threshold), possible to avoid]

TRAVELING VEHICLE AND METHOD OF CONTROLLING THE SAME

This application claims priority to Japanese Patent Application No. 2010-190104 filed on Aug. 26, 2010, the entire disclosure of which, including the specification, drawings and claims, is hereby incorporated herein by reference in its entirety.

BACKGROUND OF THE INVENTION

1. Field of the Invention

The present invention relates to a traveling vehicle for operations such as transportation of articles, and particularly to a traveling vehicle including an obstacle sensor to detect obstacles.

2. Description of the Related Art

Conventionally, traveling vehicles such as unmanned carriers include an obstacle sensor which detects obstacles to avoid collisions with them.

For example, an obstacle sensor projects laser light rotationally in various directions and receives light reflected from an object, such as an article, in a path of the traveling vehicle. This allows the traveling vehicle to detect an obstacle within a range in a traveling direction, a distance to the obstacle, and a shape and dimensions of the obstacle, for example.

There are disclosed techniques for control of traveling vehicles using results of detection performed by such object sensors.

For example, according to Japanese Unexamined Patent Application Publication Number 10-161745, a traveling vehicle is decelerated according to a result of detection performed by a proximity sensor on the front of the traveling vehicle. With this, the traveling vehicle may be stopped in a vicinity of another traveling vehicle ahead, so that efficient use of factory space is achieved.

A traveling vehicle for transporting articles may transport an article by traveling along a predetermined path. When an obstacle sensor detects an obstacle in the path while the traveling vehicle is transporting an article, the traveling vehicle decelerates and stops to avoid a collision with the obstacle. As a result, traveling vehicles following the traveling vehicle are forced to stop.

In this case, for example, an operator receives an error notification from the traveling vehicle and goes and removes the obstacle manually. Subsequently, the traveling vehicle and the traveling vehicles following it restart running to resume the interrupted transportation.

In other words, the presence of one obstacle decreases the efficiency of transportation performed by the traveling vehicles.

The traveling vehicle which stops upon detection of an obstacle may perform an avoidance operation (for example, passing by the obstacle) according to a result of detection performed by the obstacle sensor before an operator removes the obstacle to continue transportation.

However, even in the case of such an operation, the traveling vehicles are generally set to travel around a predetermined route repeatedly, so that the traveling vehicles decelerate, stop, and perform an avoidance operation every time they pass the place as long as the obstacle is present in the path.

In addition, in the case where the traveling vehicles are controlled so that transportation may be continued even when there is an obstacle, it is difficult for an operator to safely remove an obstacle. Therefore, a decrease in the overall efficiency of transportation is unavoidable.

Specifically, when there is an obstacle in the path of the traveling vehicle, the obstacle sensor detects the obstacle and a collision of the traveling vehicle with the obstacle is prevented. However, in this case, not only the traveling vehicle but also other traveling vehicles suspend transportation of articles. This operation may cause a great decrease in the efficiency of the transportation performed by the traveling vehicles.

SUMMARY OF THE INVENTION

In view of the problems with the conventional techniques, preferred embodiments of the present invention provide a traveling vehicle which efficiently performs operations such as transportation of articles even when there is an obstacle in a path and the obstacle is not removed immediately.

A traveling vehicle according to a preferred embodiment of the present invention travels along a predetermined path, and includes an obstacle sensor arranged to detect an obstacle which is located in the path and within a first distance from the traveling vehicle; a controller which causes the traveling vehicle to perform a first avoidance operation so as to avoid the obstacle according to a result of the detection of the obstacle, the detection being performed by the obstacle sensor when a distance from the traveling vehicle to the obstacle is a second distance which is shorter than the first distance; and a memory unit configured to store position information and avoidance amount information which are obtained from the result of the detection, the position information indicating a position of the obstacle in the path, and the avoidance amount information indicating an amount of avoidance in a lateral direction performed by the traveling vehicle in the first avoidance operation, wherein, when the position information and the avoidance amount information are stored in the memory unit and the obstacle sensor detects an obstacle at the position indicated by the position information at a point when the obstacle is within the first distance from the traveling vehicle, the controller causes the traveling vehicle to start a second avoidance operation, before the distance from the traveling vehicle to the obstacle reaches the second distance, so as to avoid the obstacle based on the avoidance amount information stored in the memory unit.

In this configuration, after performing the first avoidance operation to avoid an obstacle in the path, the traveling vehicle has position information and avoidance amount information which correspond to the obstacle. With this information, when the traveling vehicle subsequently detects the obstacle at the position indicated by the position information, the traveling vehicle can avoid the obstacle by performing the second avoidance operation based on the stored avoidance amount information and keep traveling.

In other words, the traveling vehicle according to this preferred embodiment performs the second avoidance operation based on the information used for the first avoidance operation. The traveling vehicle thereby starts the second avoidance operation more quickly than when the traveling vehicle detects an obstacle for the first time. Consequently, for example, the traveling vehicle can avoid the obstacle at an almost normal traveling speed to continue operations such as transportation of articles.

In other words, the traveling vehicle according to this preferred embodiment efficiently performs operations such as transportation of articles even when there is an obstacle in a path and the obstacle is not removed immediately.

Furthermore, in the traveling vehicle according to another preferred embodiment of the present invention, the obstacle sensor may further detect a length of the obstacle which the traveling vehicle avoids by performing the first avoidance operation, the length extending in a traveling direction of the traveling vehicle, the memory unit may be further configured to store length information indicating the length of the obstacle detected by the obstacle sensor, and the controller may further cause, when the traveling vehicle travels off the path after the first avoidance operation, the traveling vehicle to perform a first return operation so as to return to the path based on the length information, and cause, after the traveling vehicle starts the second avoidance operation, the traveling vehicle to perform a second return operation so as to return to the path based on the length information stored in the memory unit.

In this configuration, the traveling vehicle also has length information indicating the length of the obstacle which the traveling vehicle has avoided by performing the first avoidance operation. With this information, the traveling vehicle according to this preferred embodiment may easily and safely return to the original path after starting the second avoidance operation based on the length information.

Furthermore, in the traveling vehicle according to a preferred embodiment of the present invention, before causing the traveling vehicle to perform the second avoidance operation, the controller further may determine, from a result of the obstacle sensor's detection of the obstacle to be avoided by performing the second avoidance operation, whether the traveling vehicle can avoid the obstacle by performing an operation based on the avoidance amount information stored in the memory unit, and cause the traveling vehicle to perform the second avoidance operation when the controller determines that the traveling vehicle can avoid the obstacle by performing the operation.

In this configuration, the controller accurately determines whether or not the traveling vehicle can avoid an obstacle by performing the second avoidance operation based on the stored avoidance amount information. Therefore, the traveling vehicle according to this preferred embodiment can avoid obstacles with increased reliability and safety.

Furthermore, in the traveling vehicle according to a preferred embodiment of the present invention, the controller may compare the avoidance amount information stored in the memory unit and the result of the detection of the obstacle to be avoided by performing the second avoidance operation, and determine that the traveling vehicle can avoid the obstacle by performing the operation based on the avoidance amount information when the controller determines, by the comparison, that the obstacle avoided by performing the first avoidance operation and the obstacle to be avoided by performing the second avoidance operation are identical.

In this configuration, the controller accurately determines whether or not the traveling vehicle should perform an avoidance operation based on the stored avoidance amount information, depending on whether or not the obstacle avoided by performing the first avoidance operation (a previous obstacle) and an obstacle to be avoided by performing the second avoidance operation (a current obstacle) are identical.

When the previous obstacle and the current obstacle are not identical, for example, when they are the same object but different in position, the controller may control the traveling vehicle such that the traveling vehicle does not perform the second avoidance operation based on the avoidance amount information.

Furthermore, in the traveling vehicle according to a preferred embodiment of the present invention, the controller may determine whether or not the obstacle avoided by performing the first avoidance operation and the obstacle to be avoided by performing the second avoidance operation are identical, by comparing (i) information indicated by the avoidance amount information stored in the memory unit and indicating a shape or a dimension of the obstacle avoided by performing the first avoidance operation and (ii) information indicated by the result of the detection of the obstacle to be avoided by performing the second avoidance operation and indicating a shape or a dimension of the obstacle to be avoided by performing the second avoidance operation.

In this configuration, the identity between the previous obstacle and the current obstacle is accurately determined based on the information on the shape or dimensions of the obstacles. Therefore, the traveling vehicle according to this preferred embodiment can avoid obstacles with further increased reliability and safety.

Furthermore, another preferred embodiment of the present invention provides a method of controlling a traveling vehicle in which the characteristic processes performed by the traveling vehicle of the various preferred embodiments of the present invention described above are performed.

In addition, another preferred embodiment of the present invention provides a recording medium having stored thereon a non-transitory computer program which causes a computer to perform the processes of the method. The program may be distributed via a transmission medium such as the Internet or a recording medium such as a digital versatile disc (DVD), for example.

According to various preferred embodiments of the present invention, a traveling vehicle efficiently is provided to perform operations such as transportation of articles even when there is an obstacle in its path and the obstacle is not removed immediately, and a method of controlling the traveling vehicle is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following describes a traveling vehicle according to preferred embodiments of the present invention with reference to the drawings.

Figure 1:
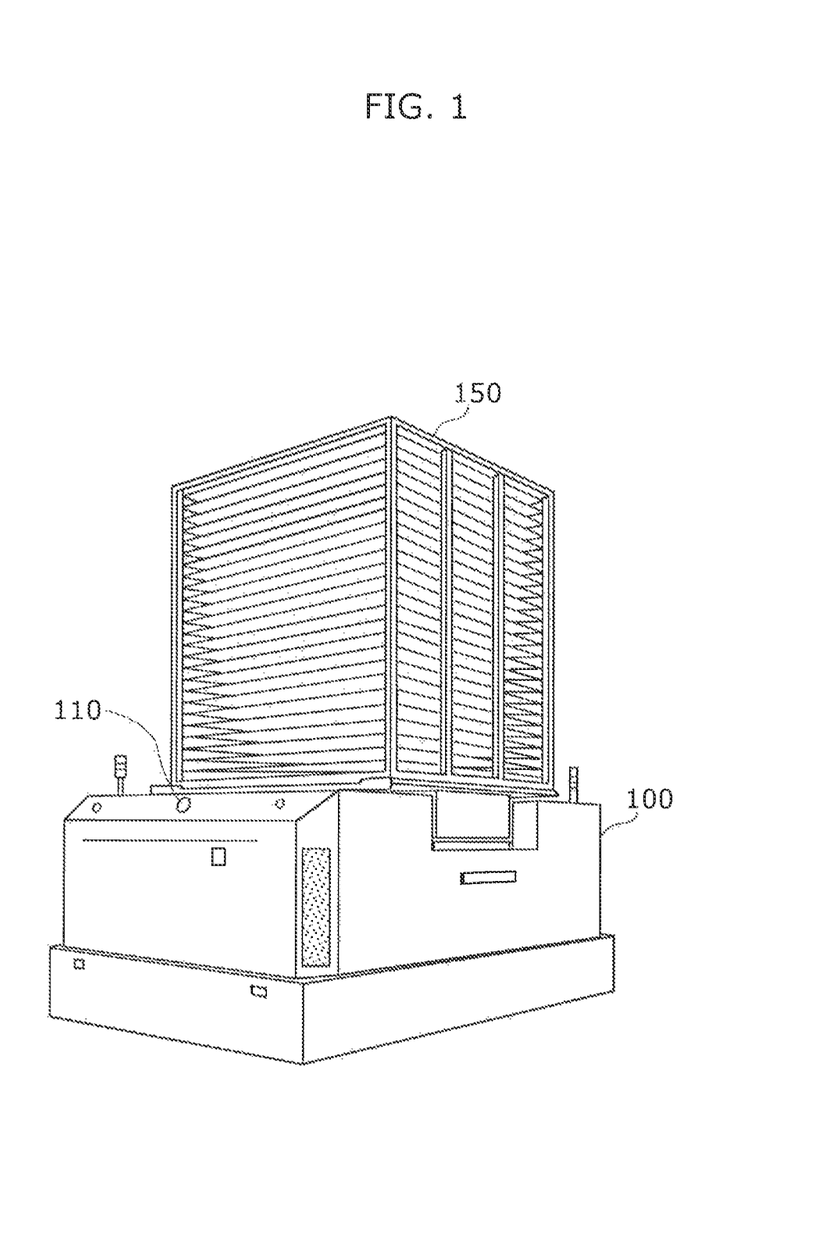
FIG. 1 shows an exemplary outside view of a traveling vehicle according to a preferred embodiment of the present invention.

FIG. 1 illustrates an exemplary outside view of a traveling vehicle according to a preferred embodiment of the present invention.

A traveling vehicle 100 shown in FIG. 1 preferably is a type of an unmanned carrier which transports articles 150 from one place to another, for example.

The traveling vehicle 100 includes an obstacle sensor 110 on the front end thereof which detects an obstacle within a range, a distance to the obstacle, and a shape and dimensions of the obstacle.

In addition, the traveling vehicle 100 autonomously travels by, for example, a laser guidance system. Specifically, the traveling vehicle 100 travels while projecting laser light in different directions and detects positions of reflectors disposed around a path. The traveling vehicle 100 determines its own position and orientation based on the result of the detection so that the traveling vehicle 100 can autonomously travel to a preset location.

The traveling vehicle 100 may autonomously travel using the laser guidance system or another method such as a magnetic guidance system.

Figure 2:
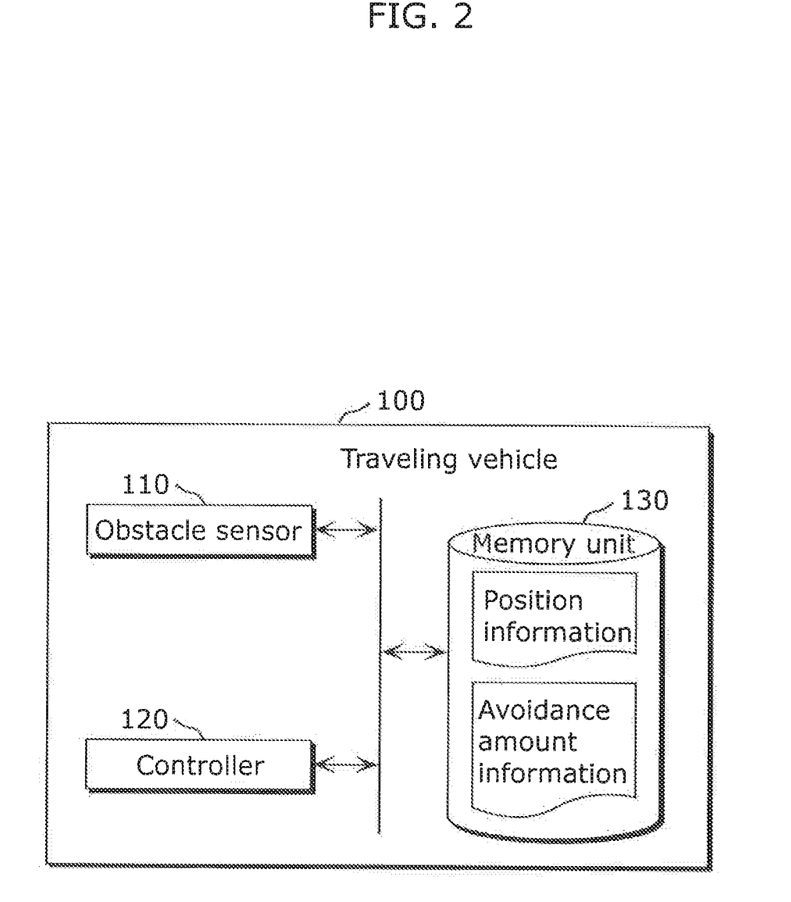
FIG. 2 is a block diagram of the traveling vehicle according to a preferred embodiment of the present invention.

FIG. 2 is a block diagram of the traveling vehicle 100 according to the present preferred embodiment of the present invention.

As shown in FIG. 2, the traveling vehicle 100 includes an obstacle sensor 110, a controller 120, and a memory unit 130.

The obstacle sensor 110 is, for example, a sensor which projects laser light rotationally in various directions and detects its reflections to detect a position of an obstacle or the like.

The controller 120 is a controller which controls operation of the traveling vehicle 100. For example, the controller 120 causes the traveling vehicle 100 to perform an avoidance operation based on a result of detection performed by the obstacle sensor 110.

Specifically, the controller 120 controls operation of the traveling vehicle 100 by controlling a motor, a steering mechanism (not shown in the drawings), and the like of the traveling vehicle 100.

The memory unit 130 is a storage device which stores various types of information. Specifically, the memory unit 130 stores position information and avoidance amount information. The position information indicates a position of an obstacle. The avoidance amount information indicates an amount of avoidance in a lateral direction corresponding to the obstacle. Specific examples of the position information and avoidance amount information will be given later with reference to FIG. 8.

Figure 3:
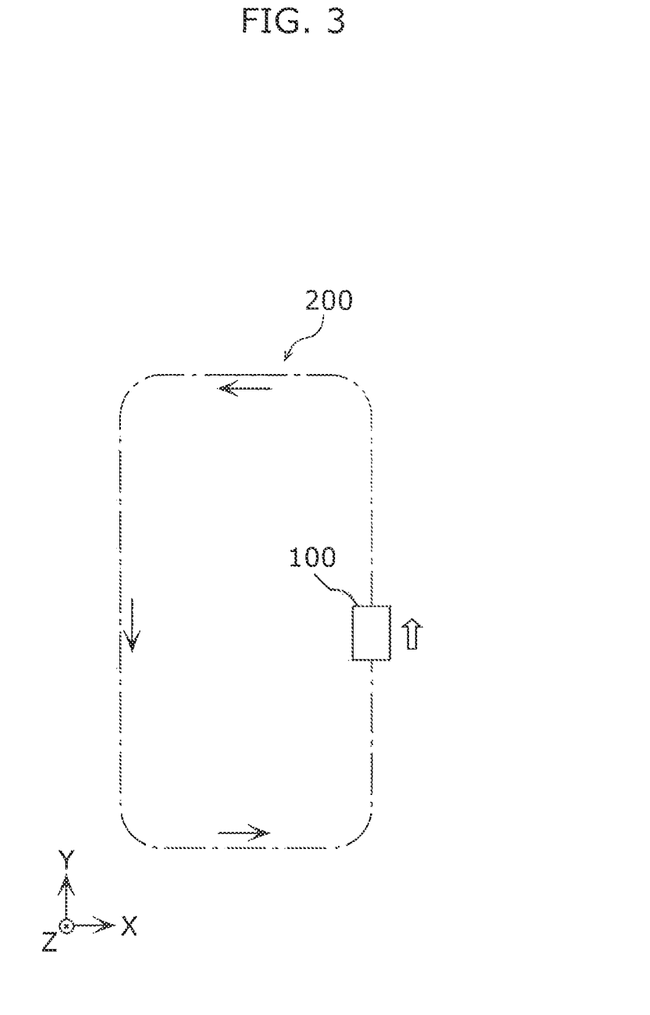
FIG. 3 shows an exemplary path of the traveling vehicle according to a preferred embodiment of the present invention.

The traveling vehicle 100 including such units as main components, transports articles by traveling along a path 200 shown in FIG. 3, for example.

FIG. 3 shows an exemplary path of the traveling vehicle 100 according to the present preferred embodiment of the present invention.

For example, the traveling vehicle 100 circulates along the path 200 shown in FIG. 3 and moves articles between ports arranged along the path 200.

For example, the traveling vehicle 100 receives specific information on tasks from a higher-level control unit which controls traveling vehicles including the traveling vehicle 100, and the traveling vehicle 100 stores the information as task information in the memory unit 130. The controller 120 controls the traveling vehicle 100 according to an instruction indicated by the task information stored in the memory unit 130.

In addition, the traveling vehicle 100 includes the obstacle sensor 110 as mentioned above, which detects an obstacle in the path 200.

Figure 4:
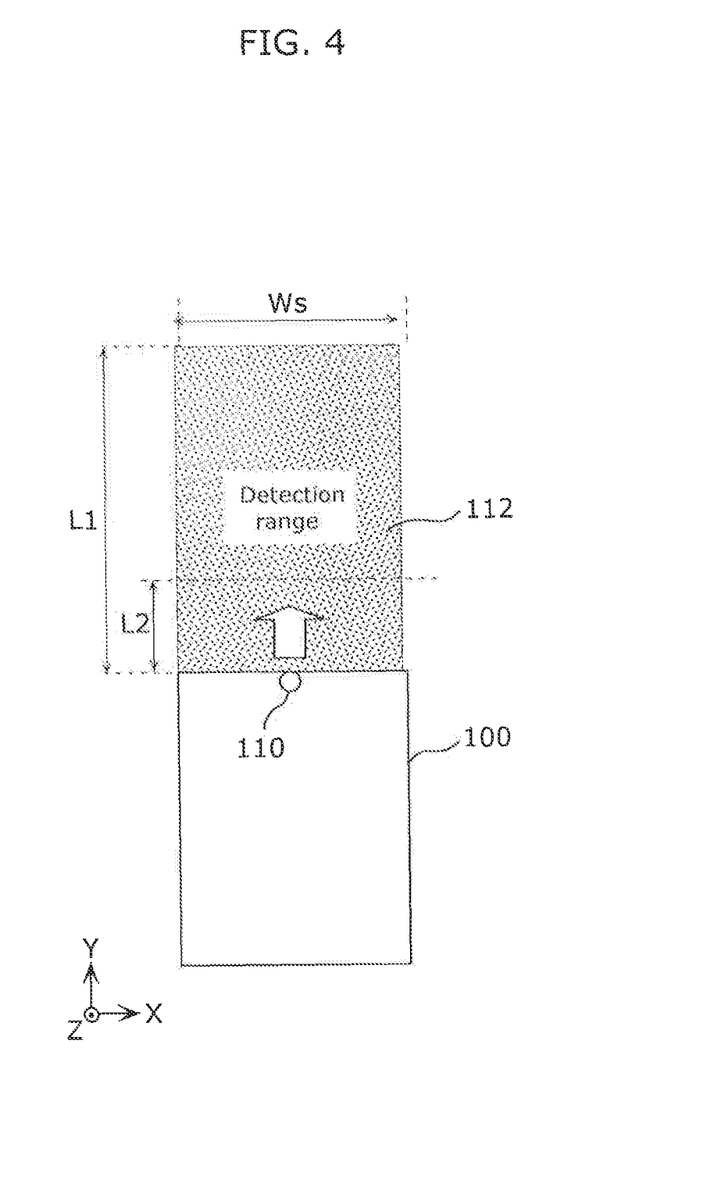
FIG. 4 shows an exemplary detection range of an obstacle sensor according to a preferred embodiment of the present invention.

FIG. 4 shows an exemplary detection range of the obstacle sensor 110 according to the present preferred embodiment of the present invention.

The obstacle sensor 110 detects an obstacle in a range (detection range) which is set as shown in FIG. 4, for example. Specifically, the detection range 112 according to the present preferred embodiment has a width Ws approximately as wide as the width of the traveling vehicle 100 (the width in the X-axis) and extends a first distance (L1) from the front end of the traveling vehicle 100.

In other words, the obstacle sensor 110 is set to detect an obstacle located in the path 200 and within a distance of L1 from the traveling vehicle 100.

A second distance (L2) is also specified which is shorter than L1. The traveling vehicle 100 stops under control of the controller 120 when there is an obstacle within a distance of L2 from the traveling vehicle 100.

For example, L1 is set to approximately 1.5 m to 2.5 m, and L2 is set to approximately 0.5 m to 1 m.

It is to be noted that the size and the shape of the detection range 112 shown in FIG. 4 is for illustrative purpose only and is not limited in any way. Optionally, the size and the shape of the detection range 112 may be changed while the traveling vehicle 100 is traveling.

The following describes operation of detecting and avoiding an obstacle performed by the traveling vehicle 100 with reference to FIG. 5 to FIG. 11.

Figure 5:
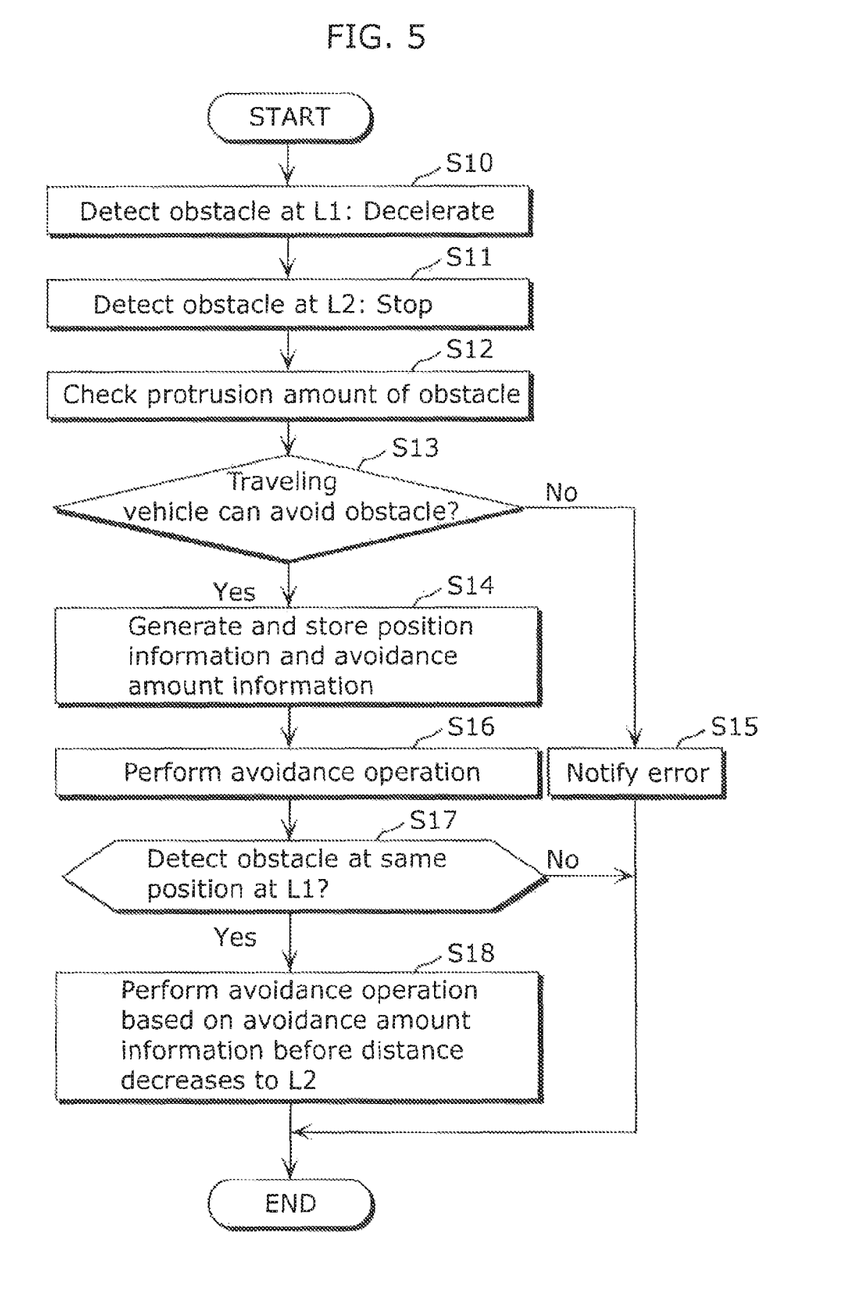
FIG. 5 is a flowchart showing an example of operation of detecting and avoiding an obstacle by the traveling vehicle according to a preferred embodiment of the present invention.

FIG. 5 is a flowchart showing an example of operation of detecting and avoiding an obstacle by the traveling vehicle 100 according to the present preferred embodiment of the present invention.

In the following description, it is assumed that an obstacle is present in the path 200 so that the obstacle interferes with the traveling vehicle 100 traveling along the path 200.

First, the traveling vehicle 100 travels along the path 200 so that the distance from the traveling vehicle 100 to an obstacle decreases, and the obstacle sensor 110 detects the obstacle when the distance is reduced to L1 or less. The controller 120 decelerates the traveling vehicle 100 based on the result of the detection so that the traveling vehicle 100 travels at a low speed (S10).

Next, in the case where the traveling vehicle 100 further approaches the obstacle and the obstacle sensor 110 still detects the obstacle even when the distance reaches L2, the controller 120 stops the traveling vehicle 100 (S11).

Then, the controller 120 causes the traveling vehicle 100 to perform a first avoidance operation in order to avoid the obstacle, according to the result of the detection performed by the obstacle sensor 110 when the distance is L2.

Specifically, for example, the controller 120 checks the protrusion amount of the obstacle into the path 200 based on the result of the detection performed by the obstacle sensor 110 (S12).

Next, the controller 120 determines whether or not the traveling vehicle 100 may further move forward without a collision with the obstacle, that is, whether or not the traveling vehicle 100 can avoid the obstacle based on information such as the protrusion amount of the obstacle and the width of the aisle along which the traveling vehicle 100 is traveling (S13).

Next, when the controller 120 determines that the traveling vehicle 100 can avoid the obstacle (Yes in S13), the controller 120 generates position information and avoidance amount information based on the result of the detection performed by the obstacle sensor 110, and stores the information in the memory unit 130. The position information indicates the position of the obstacle. The avoidance amount information indicates the amount of avoidance in a lateral direction performed in an avoidance operation to avoid the obstacle (S14).

Additionally, the controller 120 causes the traveling vehicle 100 to perform the first avoidance operation to avoid the obstacle (S16).

When the controller 120 determines that the traveling vehicle 100 cannot avoid the obstacle (No in S13), the controller 120 may send an error notification to the higher-level control unit (S15).

After performing the first avoidance operation, the traveling vehicle 100 having the position information and the avoidance amount information in the memory unit 130, approaches the point again where the traveling vehicle 100 has performed the first avoidance operation.

In the following, it is assumed that subsequently the obstacle sensor 110 detects the obstacle at the position indicated by the position information stored in the memory unit 130 when the distance from the traveling vehicle 100 to the obstacle is equal to or shorter than L1 (Yes in S17).

In other words, it is assumed that an obstacle to be avoided (hereinafter referred to as a "current obstacle") is present again at the position the obstacle avoided by performing the first avoidance operation (hereinafter referred to as a "previous obstacle").

In this case, the controller 120 causes the traveling vehicle 100 to start a second avoidance operation to avoid the current obstacle before the distance from the traveling vehicle 100 to the current obstacle reaches L2 (S18). The second avoidance operation is performed based on the avoidance amount information stored in the memory unit 130.

Here, the presence of the current obstacle at the same position as the previous obstacle practically and typically means that the article detected as the previous obstacle in the path 200 is left untouched.

Thus, the controller 120 uses the avoidance amount information indicating the amount of avoidance in a lateral direction performed in the avoidance operation to avoid the previous obstacle so that an avoidance operation (the second avoidance operation) can be started upon the detection of the current obstacle.

The following is a specific example of the first avoidance operation and the second avoidance operation with reference to FIG. 6 to FIG. 9.

Figure 6:
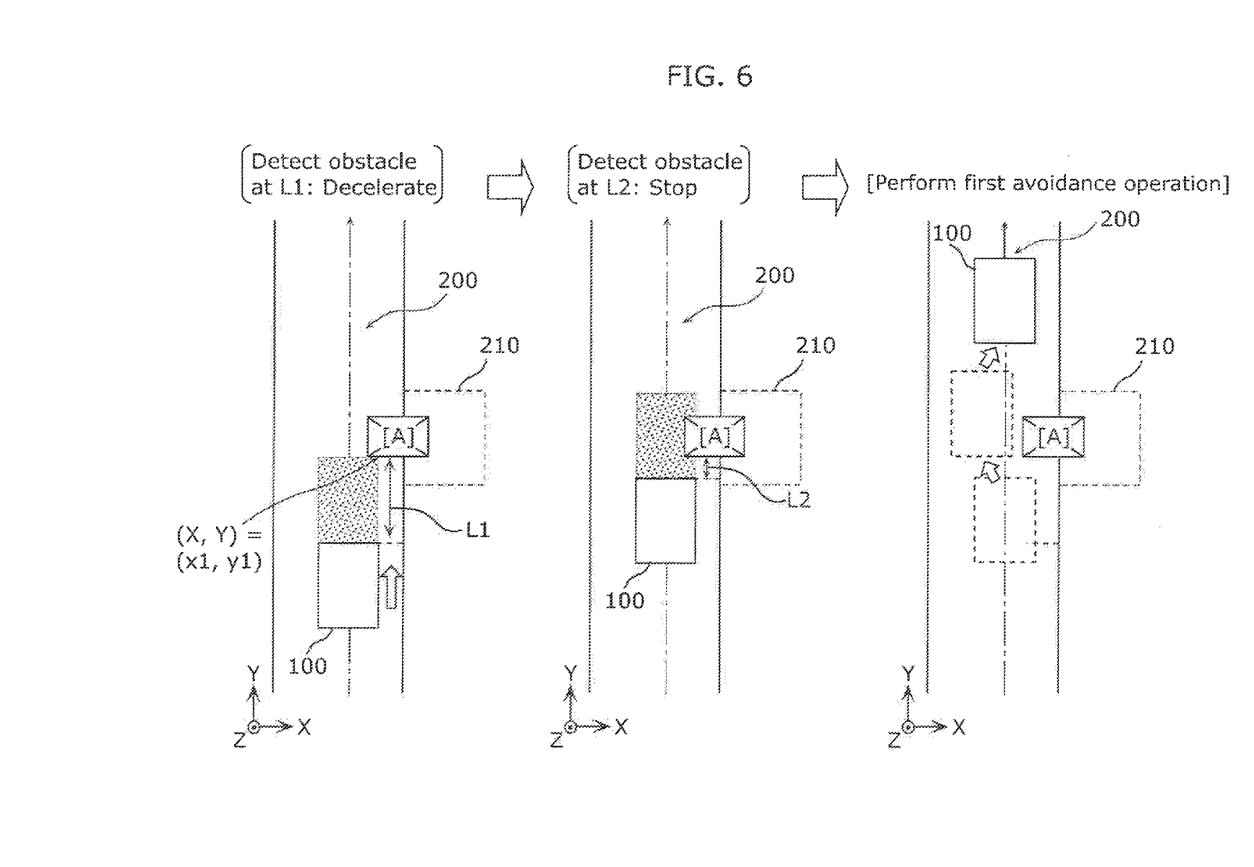
FIG. 6 illustrates plan views of a first avoidance operation according to a preferred embodiment of the present invention.

FIG. 6 illustrates plan views of the first avoidance operation according to the present preferred embodiment of the present invention.

Figure 7:
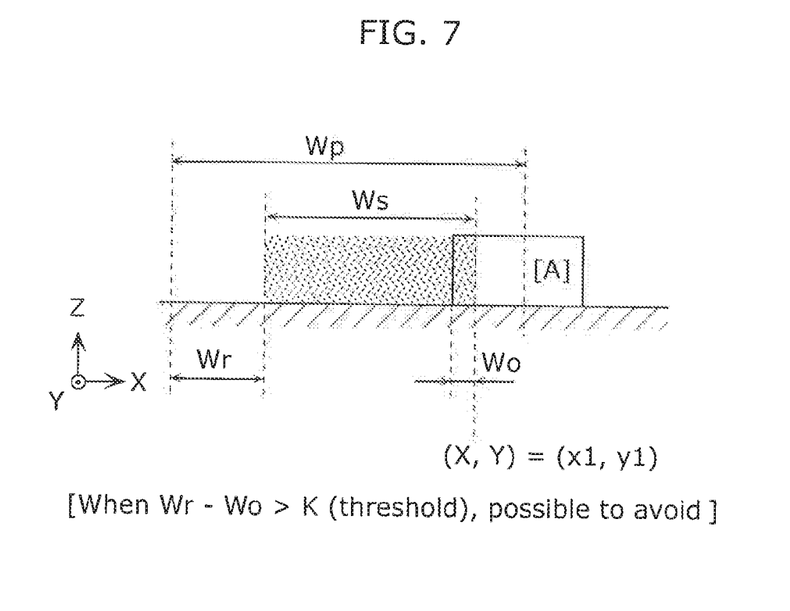
FIG. 7 is a drawing illustrating an exemplary method of determination as to whether or not the traveling vehicle can avoid an obstacle according to a preferred embodiment of the present invention.

FIG. 7 is a drawing illustrating an exemplary method of determination as to whether or not the traveling vehicle 100 can avoid an obstacle according to the present preferred embodiment of the present invention.

Figure 8:
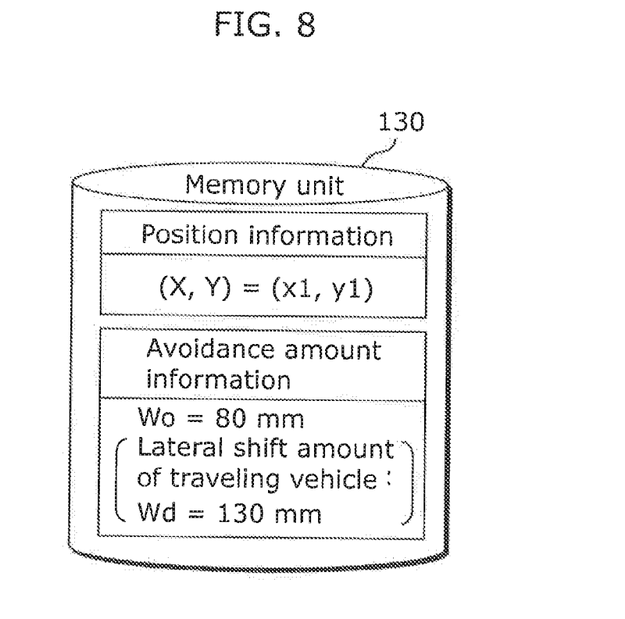
FIG. 8 illustrates an example of position information and avoidance amount information according to a preferred embodiment of the present invention.

FIG. 8 illustrates an example of position information and avoidance amount information according to the present preferred embodiment of the present invention.

Figure 9:
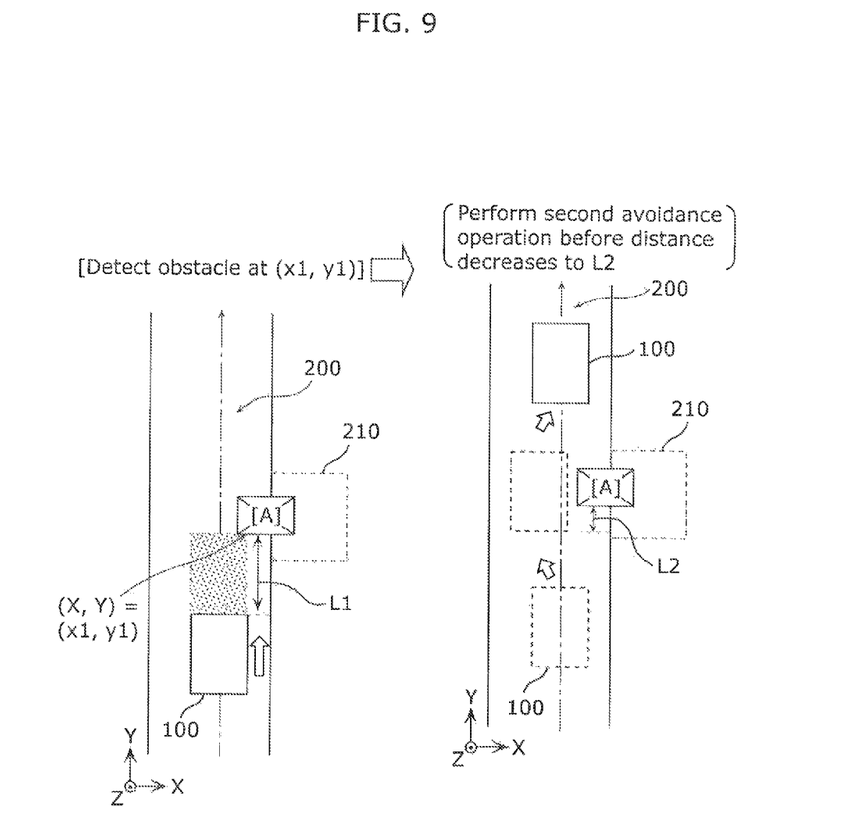
FIG. 9 illustrates plan views of a second avoidance operation according to a preferred embodiment of the present invention.

FIG. 9 illustrates plan views of the second avoidance operation according to the present preferred embodiment of the present invention.

In the following, it is assumed that an article [A] which needs to be placed in a port 210 is protruding into the path 200 as shown in FIG. 6. In other words, it is assumed that the article [A] is an obstacle [A] present in the path 200.

In this case, the traveling vehicle 100 detects the obstacle [A] at a point when the obstacle [A] is within a distance of L1 from the traveling vehicle 100, and then starts deceleration. In addition, for example, the traveling vehicle 100 at the point obtains a position (x1, y1) of the obstacle [A] in the path 200 from a result of the detection performed by the obstacle sensor 110.

The position of the obstacle [A] is represented by coordinates of an intersection between the right-hand edge of the detection range 112 and the nearer side of the obstacle [A] in the example shown in FIG. 6, but the position of the obstacle [A] may be represented using any method as long as the position can be specified.

Next, the traveling vehicle 100 stops upon detecting the obstacle [A] at a point when the distance to the obstacle [A] reaches L2. Next, the traveling vehicle 100 determines whether or not the traveling vehicle 100 can avoid the obstacle [A], and performs the first avoidance operation when traveling vehicle 100 determines that the traveling vehicle 100 can avoid the obstacle [A].

Specifically, the determination as to whether or not the traveling vehicle 100 can avoid the obstacle [A] is made based on information including the information on the protrusion amount of the obstacle [A] as shown in FIG. 7.

In FIG. 7, for example, Wp denotes the width of the aisle along which the traveling vehicle 100 is traveling, Wo denotes the protrusion amount of the obstacle [A], and Wr denotes an available amount of a shift to the left of the traveling vehicle 100.

Specifically, the controller 120 obtains Wo from the result of the detection performed by the obstacle sensor 110. In addition, as the traveling vehicle 100 can perform a function of recognizing its own position, the controller 120 may calculate Wr from map information on aisles and the path 200 stored in the memory unit and its own position.

Under the assumption above, the controller 120 determines that the traveling vehicle 100 can avoid the obstacle [A] when Wr−Wo is greater than a threshold K.

For example, when Wo=80 mm, Wr=150 mm, and K=50 mm, Wr−Wo=70 mm>K, the controller 120 determines that the traveling vehicle 100 can avoid the obstacle [A].

As a result, the traveling vehicle 100 performs the first avoidance operation as shown in the right-hand diagram of the FIG. 6.

In addition, position information and avoidance amount information are stored in the memory unit 130 as shown in FIG. 8.

The avoidance amount information may be information indicating the protrusion amount of the obstacle avoided by performing the first avoidance operation or information indicating a distance of a lateral shift (made or to be made) according to the protrusion amount by the traveling vehicle 100.

For example, it is assumed that the traveling vehicle 100 avoids the obstacle by making a shift 50 mm longer than the protrusion amount of the obstacle. In this case, when Wo=80 mm as in the present example, the traveling vehicle 100 makes a left shift of 130 mm (that is, the traveling vehicle 100 travels 130 mm away to the left from the original path 200) to avoid the obstacle [A] and further move forward.

In this case, either "Wo=80 mm" or "Wd=130 mm", which is the shift amount of the traveling vehicle 100, may be stored as the avoidance amount information as shown in FIG. 8.

The direction (right or left) in which the traveling vehicle 100 shifts to avoid an obstacle may be indicated using positive figures or negative figures indicated by the avoidance amount information. For example, a positive number indicates a shift to the left, and a negative number indicates a shift to the right.

When the controller 120 determines that the traveling vehicle 100 can avoid the obstacle [A], it is not necessary for the controller 120 to determine a lateral avoidance amount (shift amount) depending on the protrusion amount Wo of the obstacle [A]. In this case, for example, the controller 120 may cause the traveling vehicle 100 to travel along the side opposite to the obstacle [A], that is, perform an avoidance operation by passing the obstacle [A] to the right with a clearance as long as possible.

In other words, when Wr=150 mm in FIG. 7, the traveling vehicle 100 may avoid the obstacle [A] with a shift of Wr=145 mm to the left with a clearance of 5 mm from the left end of the aisle. In this case, only the direction of the avoidance, "left", may be stored as the avoidance amount information.

The avoidance amount information stored in the memory unit 130 in this manner is used for an avoidance operation when the obstacle is detected again at the position indicated by the position information stored in the memory unit 130 along with the avoidance amount information.

For example, it is assumed that the obstacle [A] is left untouched as shown in FIG. 9. In this case, the obstacle sensor 110 detects the obstacle at the position represented by the coordinates (x1, y1) indicated by the position information stored in the memory unit 130, that is, the obstacle [A] in the present example when the obstacle [A] is within a distance L1 from the traveling vehicle 100.

Upon the detection of the obstacle [A], the controller 120 causes the traveling vehicle 100 to start the second avoidance operation to avoid the obstacle [A] before the distance from the traveling vehicle 100 to the obstacle [A] reaches L2. Here, the avoidance amount information stored in the memory unit 130 is used for the second avoidance operation.

For example, when the stored avoidance amount information indicates "Wo=80 mm", the controller 120 controls the traveling vehicle 100 such that the traveling vehicle 100 performs the second avoidance by making a left shift of 130 mm, which is obtained by adding Wo=80 mm and a predetermined 50 mm.

In other words, the second avoidance operation is quickly started based on the avoidance amount information upon detection of the obstacle [A] as shown in FIG. 9. This allows the traveling vehicle 100 to travel at a constant speed with no stop, unlike in the case of the first avoidance operation.

In this manner, when there is an obstacle in the path 200, the traveling vehicle 100 according to the present preferred embodiment stores information on the first avoidance operation, and may use the information for subsequent avoidance operations of the obstacle.

With this, the subsequent avoidance operation of the obstacle by the traveling vehicle 100 may be triggered by a detection of the obstacle from a relatively long distance. This means that the traveling vehicle 100 may avoid and pass by the obstacle at a constant speed to keep traveling.

Therefore, according to the present preferred embodiment, inefficient operation such as decelerating and stopping of the traveling vehicle 100 whenever it approaches an obstacle is avoided, and thus the traveling vehicle 100 can perform operations such as transportation of articles efficiently.

Referring to the exemplary operations in FIG. 6 and FIG. 9, the traveling vehicle 100 performs a return operation through which the traveling vehicle 100 traveling off the path 200 after the avoidance operation of the obstacle returns to the path 200.

This is performed by the traveling vehicle 100 under the control of the controller 120 such that, for example, the traveling vehicle 100 returns to the path 200 after traveling a distance determined by considering safety when the traveling vehicle 100 makes a right shift or a left shift to avoid an obstacle.

Optionally, for example, the obstacle sensor 110 may detect the length of the obstacle in the traveling direction of the traveling vehicle 100 (the y-axis direction in the case of FIG. 6 and FIG. 9), and the controller 120 may control the return operation of the traveling vehicle 100 based on the result of the detection.

In addition, the length information indicating the length of the obstacle detected in the first avoidance operation may be stored in the memory unit 130 and used for the return operation after the second avoidance operation.

Figure 10:
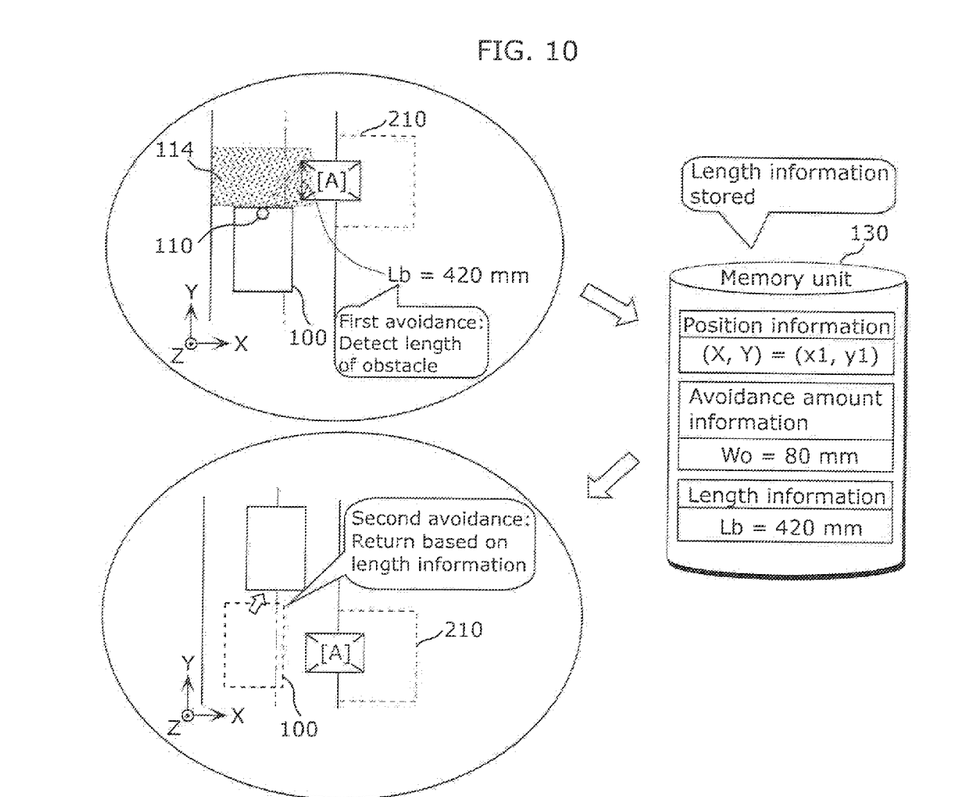
FIG. 10 shows an example of operational control performed by the traveling vehicle according to a preferred embodiment of the present invention based on the length information of an obstacle.

FIG. 10 shows an example of operational control performed by the traveling vehicle 100 according to the present preferred embodiment of the present invention based on the length information of an obstacle.

For example, the detection range of the obstacle sensor 110 is switched from the detection range 112 (see FIG. 4) to a detection range 114 as shown in FIG. 10 so that the obstacle sensor 110 can detect the length of the obstacle [A].

Optionally, another sensor for detection of the length of the obstacle [A] may be provided on a side of the traveling vehicle 100. In this case, the obstacle sensor 110 and the other sensor are the obstacle sensors of the traveling vehicle according to a preferred embodiment of the present invention.

The obstacle sensor 110 detects the length of the obstacle [A] and length information indicating the length is stored in the memory unit 130 when the traveling vehicle 100 first avoids the obstacle [A], that is, when the traveling vehicle 100 performs the first avoidance operation.

For example, "Lb=420 mm", which is the length of the obstacle [A], is stored as the length information in the memory unit 130 along with the position information and the avoidance amount information, as shown in FIG. 10.

After the first avoidance operation, the traveling vehicle 100 performs a return operation (a first return operation) based on the length information "Lb=420 mm" to return to the path 200.

The traveling vehicle 100 travels around a predetermined route once and approaches the point again where the traveling vehicle 100 has performed the first avoidance operation, and then performs the second avoidance operation based on the avoidance amount information as described above.

Thus, the traveling vehicle 100 travels off the path 200 again. For this time, the traveling vehicle 100 has the length information of "Lb=420 mm" in the memory unit 130. This allows the traveling vehicle 100 to easily and safely return to the path 200 by performing the return operation based on the length information of "Lb=420 mm" stored in the memory unit 130 (the second return operation) without performing a detection the length of the obstacle [A] again.

When the obstacle at the position indicated by position information is detected after performing the first avoidance operation, the traveling vehicle 100 according to the present preferred embodiment performs the second avoidance operation based on the avoidance amount information stored along with the position information.

The traveling vehicle 100 is configured in this manner because the presence of the current obstacle at the same position as the previous obstacle practically and typically means that the previous obstacle in the path 200 is left untouched with high probability.

However, a determination may be additionally made as to whether or not the traveling vehicle 100 can avoid the current obstacle by an operation based on the avoidance amount information when the current obstacle is detected at the same position as the previous obstacle.

For example, the controller 120 may determine, according to a result of detection performed by the obstacle sensor 110, whether or not the previous obstacle and the current obstacle are identical, and cause the traveling vehicle 100 to perform the second avoidance operation based on stored avoidance amount information when they are identical.

In other words, when the previous obstacle and the current obstacle are not identical, for example, when they are the same object but different in position, the controller 120 controls the traveling vehicle 100 such that the traveling vehicle 100 does not perform the second avoidance operation based on the avoidance amount information. Therefore, the traveling vehicle 100 can avoid obstacles with further increased reliability and safety.

Figure 11:
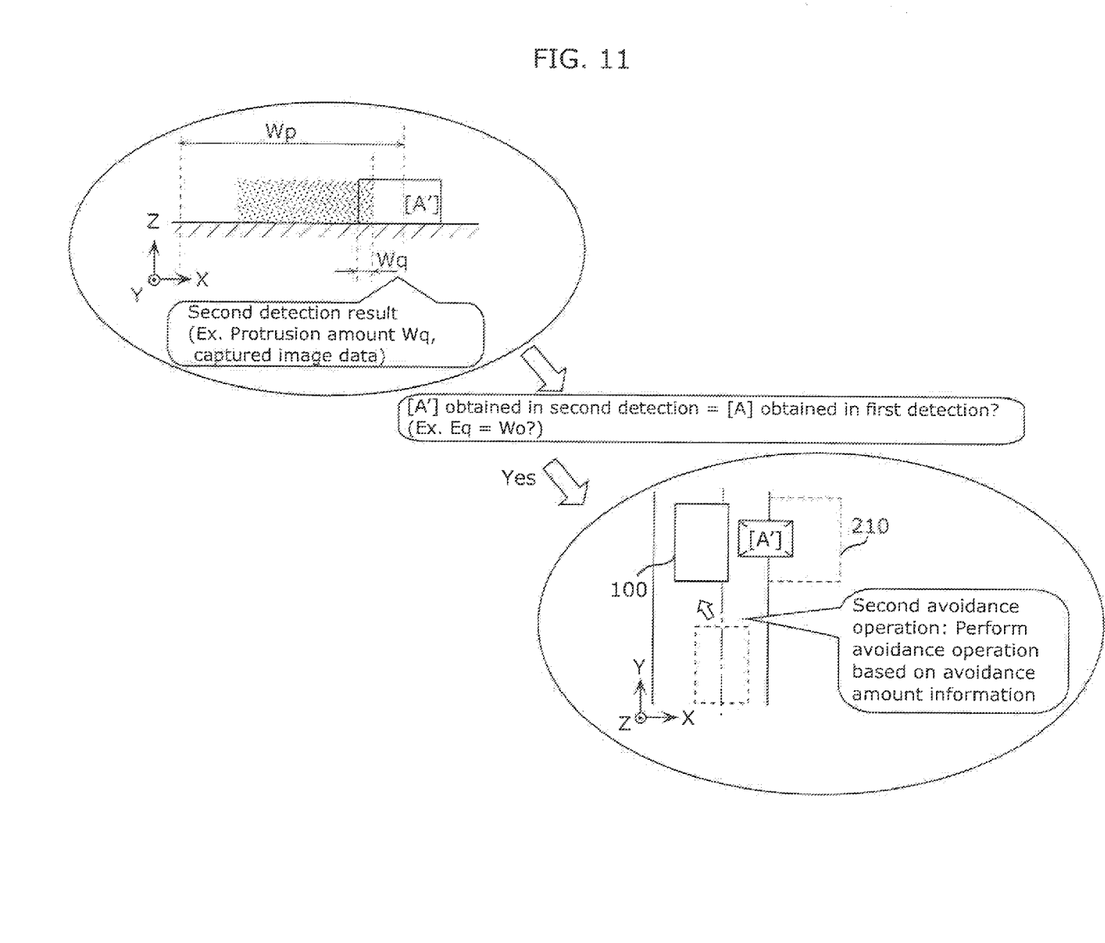
FIG. 11 shows an example of operational control performed by the traveling vehicle according to a preferred embodiment of the present invention based on the determination as to the identity of a previous obstacle and a current obstacle.

FIG. 11 shows an example of operational control performed by the traveling vehicle 100 according to the present preferred embodiment of the present invention based on the determination as to the identity of the previous obstacle and the current obstacle.

For example, it is assumed that an obstacle [A'], which is the current obstacle, is present at the position indicated by the position information stored in the memory unit 130, and the obstacle sensor 110 detects the obstacle [A'].

In this case, the controller 120 obtains, for example, a protrusion amount Wq of the obstacle [A'] from the result of the detection performed by the obstacle sensor 110. Next, the controller 120 compares the protrusion amount Wq of the obstacle [A'] with the protrusion amount Wo of the obstacle [A], which is the previous obstacle.

When the comparison shows that Wq=Wo, the controller 120 determines that the obstacle [A'] and the obstacle [A] are identical, and then causes the traveling vehicle 100 to perform the second avoidance operation based on the avoidance amount information stored in the memory unit 130.

Optionally, the controller 120 may determine whether or not the previous obstacle and the current obstacle are identical by comparing the shape of the previous obstacle and the shape of the current obstacle.

For example, the identity of the obstacles may be determined by superimposing one of two-dimensional or three dimensional images of the obstacle [A'] and the obstacle [A] on another in a coordinate system. The images are obtained by the obstacle sensor 110 by scanning them with laser light.

For another example, when a camera is used as the obstacle sensor 110, the controller 120 superimposes image data including positional coordinates of the obstacle [A'] and the obstacle [A] obtained by the camera in a coordinate system. The identity of the obstacles may be thus determined.

These obstacles are therefore determined to be identical when it is determined that the obstacles have the same shape and are located at the same position.

In this manner, whether or not the previous obstacle and the current obstacle are identical may be determined by comparing information on the shape or dimensions of the previous obstacle and information on the shape or dimensions of the current obstacle. As a result, the traveling vehicle 100 can avoid obstacles with further increased reliability and safety.

The obstacle [A'] is determined as a new obstacle when the controller 120 determines that the obstacle [A'] and the obstacle [A] are not identical. In other words, the traveling vehicle 100 performs the first avoidance operation based on the result of the detection on the obstacle [A'], and the position information and the avoidance amount information in the memory unit 130 are updated to indicate values according to the result of the detection on the obstacle [A'].

Optionally, when the controller 120 determines that the obstacle [A] and the obstacle [A'] are not identical because the protrusion amount Wq of the obstacle [A'] is less than the protrusion amount Wo of the obstacle [A], the controller 120 may determine that the traveling vehicle 100 can avoid the obstacle [A'] by an operation based on the avoidance amount information stored in the memory unit 130 despite the negative result of the determination as to the identity of the obstacles. In other words, the controller 120 may cause the traveling vehicle 100 to perform the second avoidance operation based on the stored avoidance amount information. In this configuration, the avoidance operation of the obstacle [A'] is safely performed in a similar manner.

Although only an exemplary preferred embodiment of this invention has been described in detail above, those skilled in the art will readily appreciate that many modifications are possible in the exemplary preferred embodiment without materially departing from the novel teachings and advantages of this invention. Accordingly, all such modifications are intended to be included within the scope of this invention.

For example, position information and avoidance amount information may be indicated by a single information item. For example, coordinates of the extreme point of the obstacle protruding into the path 200 may be stored in the memory unit 130 as position information.

In this case, the controller 120 may calculate the protrusion amount Wo of the obstacle (see FIG. 7) from the coordinates indicated by the position information and the coordinates of the traveling vehicle 100. In other words, the position information may be used as information indicating the position of the obstacle and the lateral avoidance of the traveling vehicle 100.

Optionally, for example, information indicating the position of the traveling vehicle 100 at a point when the traveling vehicle 100 detects an obstacle may be stored in the memory unit 130 as the position information instead of information directly indicating the position of an obstacle.

In other words, when the traveling vehicle 100 travels with a fixed detection range of the obstacle sensor 110 and detects an obstacle twice at the same position, it is proved that the obstacle is present at the same position in the first detection and the second detection.

Therefore, the traveling vehicle 100 may store its own position at the time when an obstacle is detected in the first avoidance operation in the memory unit as position information indicating the position of the obstacle, and use the position information for the second avoidance operation.

For example, when the center of the traveling vehicle 100 at the point when the traveling vehicle 100 detects the previous obstacle is (x2, y2), the traveling vehicle 100 stores "(x2, y2)" in the memory unit 130 as position information. Afterward, when the traveling vehicle 100 detects the current obstacle at a point when the center of the traveling vehicle 100 reaches (x2, y2) after circulating along the path 200 once, the traveling vehicle 100 performs the second avoidance operation based on stored avoidance amount information.

In this manner, the traveling vehicle 100 may efficiently perform the second avoidance operation even in the case where the traveling vehicle 100 stores, as position information, its own position at a point when the traveling vehicle 100 detects an obstacle.

A traveling vehicle according to various preferred embodiments of the present invention efficiently performs operations such as transportation of articles even when there is an obstacle in its path and the obstacle is not removed immediately. The traveling vehicle is therefore applicable as a traveling vehicle for transportation of articles in a factory, a warehouse, and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A traveling vehicle which travels along a path, comprising:
    an obstacle sensor arranged to detect an obstacle which is located in the path and within a first distance from the traveling vehicle;
    a controller which causes the traveling vehicle to perform a first avoidance operation so as to avoid the obstacle according to a result of a detection of the obstacle, the detection being performed by the obstacle sensor when a distance from the traveling vehicle to the obstacle is a second distance which is less than the first distance; and
    a memory unit configured to store position information and avoidance amount information which are obtained from the result of the detection of the obstacle, the position information indicating a position of the obstacle in the path, and the avoidance amount information indicating an amount of avoidance in a lateral direction performed by the traveling vehicle in the first avoidance operation; wherein
    when the position information and the avoidance amount information are stored in the memory unit and the obstacle sensor detects an obstacle at the position indicated by the position information at a point when the obstacle is within the first distance from the traveling vehicle, the controller causes the traveling vehicle to start a second avoidance operation, before the distance from the traveling vehicle to the obstacle reaches the second distance, so as to avoid the obstacle based on the avoidance amount information stored in the memory unit.

2. The traveling vehicle according to claim 1, wherein the obstacle sensor further detects a length of the obstacle which the traveling vehicle avoids by the first avoidance operation, the length extending in a traveling direction of the traveling vehicle;
    the memory unit is further configured to store length information indicating the length of the obstacle detected by the obstacle sensor; and
    the controller further causes, when the traveling vehicle travels off the path after the first avoidance operation, the traveling vehicle to perform a first return operation so as to return to the path based on the length information, and causes the traveling vehicle to perform a second return operation, after the traveling vehicle starts the second avoidance operation, so as to return to the path based on the length information stored in the memory unit.

3. The traveling vehicle according to claim 1, wherein, before causing the traveling vehicle to perform the second avoidance operation, the controller further determines, from the result of the detection of the obstacle to be avoided by performing the second avoidance operation, whether the traveling vehicle can avoid the obstacle by performing an operation based on the avoidance amount information stored in the memory unit, and causes the traveling vehicle to perform the second avoidance operation when the controller determines that the traveling vehicle can avoid the obstacle by performing the operation.

4. The traveling vehicle according to claim 3, wherein the controller compares the avoidance amount information stored in the memory unit and the result of the detection of the obstacle to be avoided by performing the second avoidance operation, and determines that the traveling vehicle can avoid the obstacle by performing the operation based on the avoidance amount information when the controller determines, by the comparison, that the obstacle avoided by performing the first avoidance operation and the obstacle to be avoided by performing the second avoidance operation are identical.

5. The traveling vehicle according to claim 4, wherein the controller determines whether or not the obstacle avoided by performing the first avoidance operation and the obstacle to be avoided by performing the second avoidance operation are identical, by comparing (i) information indicated by the avoidance amount information stored in the memory unit and indicating a shape or a dimension of the obstacle avoided by performing the first avoidance operation, and (ii) information indicated by the result of the detection of the obstacle to be avoided by performing the second avoidance operation and indicating a shape or a dimension of the obstacle to be avoided by performing the second avoidance operation.

6. A method of controlling a traveling vehicle which travels along a path and includes an obstacle sensor and a memory unit, the method comprising:
    detecting an obstacle which is located in the path and within a first distance from the traveling vehicle, using the obstacle sensor;
    causing the traveling vehicle to perform a first avoidance operation so as to avoid the obstacle according to a result of the detecting the obstacle which is performed using the obstacle sensor when a distance from the traveling vehicle to the obstacle is a second distance which is less than the first distance; and
    storing, in the memory unit, position information and avoidance amount information which are obtained from the result of the detecting the obstacle, the position information indicating a position of the obstacle in the path, and the avoidance amount information indicating an amount of avoidance in a lateral direction performed by the traveling vehicle in the first avoidance operation;
    detecting, after the position information and the avoidance amount information are stored in the memory unit, an obstacle at the position indicated by the position information at a point when the obstacle is within the first distance from the traveling vehicle, the detecting being performed using the obstacle sensor; and
    causing the traveling vehicle to start a second avoidance operation, before the distance from the traveling vehicle to the obstacle reaches the second distance, so as to avoid the obstacle based on the avoidance amount information stored in the memory unit, when the obstacle is detected at the position indicated by the position information stored in the memory unit.

* * * * *